(12) United States Patent
Malakhovskiy et al.

(10) Patent No.: US 12,517,155 B2
(45) Date of Patent: Jan. 6, 2026

(54) VOLTAGE SENSOR

(71) Applicant: GRUPPA COMPANIY TEL OBSHCHESTVO S OGRANICHENNOY OTVETSTVENNOSTYU, Moscow (RU)

(72) Inventors: Sergey Ivanovich Malakhovskiy, Moscow (RU); Dmitriy Anatolevich Sokolov, Moscow (RU)

(73) Assignee: GRUPPA COMPANIY TEL OBSHCHESTVO S OGRANICHENNOY OTVETSTVENNOSTYU, Moscow (RU)

( * ) Notice: Subject to any disclaimer, the term of this patent is extended or adjusted under 35 U.S.C. 154(b) by 269 days.

(21) Appl. No.: 18/256,073

(22) PCT Filed: Dec. 6, 2021

(86) PCT No.: PCT/RU2021/050418
§ 371 (c)(1),
(2) Date: Jun. 6, 2023

(87) PCT Pub. No.: WO2022/124942
PCT Pub. Date: Jun. 16, 2022

(65) Prior Publication Data
US 2024/0019466 A1    Jan. 18, 2024

(30) Foreign Application Priority Data

Dec. 7, 2020  (RU) .......................... RU2020140169

(51) Int. Cl.
GO1R 19/00    (2006.01)
GO1R 15/16    (2006.01)
GO1R 31/327   (2006.01)

(52) U.S. Cl.
CPC ......... G01R 19/0084 (2013.01); G01R 15/16 (2013.01); G01R 31/3274 (2013.01)

(58) Field of Classification Search
CPC ................ G01R 19/00; G01R 19/0084; G01R 19/0092; G01R 19/145; G01R 19/155;
(Continued)

(56) References Cited

U.S. PATENT DOCUMENTS 3,650,154 A * 3/1972 Arnett ...................... G01K 7/14
                                              374/E7.015
4,241,373 A * 12/1980 Mara ..................... G01R 15/142
                                              324/133
(Continued)

FOREIGN PATENT DOCUMENTS

EP    2853903 A1 *  4/2015 ............. G01R 15/06
EP    3712739 A1 *  9/2020 ............. G05F 1/567
WO   WO-0194956 A1 * 12/2001 ............. G01R 15/16

*Primary Examiner* — Hoai-An D. Nguyen
(74) *Attorney, Agent, or Firm* — LEASON ELLIS LLP

(57) ABSTRACT

A voltage sensor comprises a voltage divider configuration with first and second circuit portions providing first and second impedances. The first and second circuit portions are configured such that the temperature dependence of the second impedance matches the temperature dependence of the 5 first impedance within an operating temperature range. The impedance component of the second circuit portion and the impedance component of the first circuit portion are co-located with each other or otherwise located in one or more location that is subject to, in use, substantially the same temperature. The voltage sensor exhibits improved accuracy in comparison with voltage sensors without temperature compensation, and may also exhibit improved accuracy over temperature-0 compensated voltage sensors that rely on temperature measurement since temperature measurement can be a source of error.

20 Claims, 3 Drawing Sheets

(58) Field of Classification Search
CPC ........ G01R 15/00; G01R 15/04; G01R 15/06; G01R 15/14; G01R 15/16; G01R 15/165; G01R 31/00; G01R 31/327; G01R 31/3271; G01R 31/3272; G01R 31/3274
USPC ...................................................... 324/76.11
See application file for complete search history.

(56) References Cited

U.S. PATENT DOCUMENTS

| | | | | | |
|---|---|---|---|---|---|
| 4,963,819 | A | * | 10/1990 | Clarke | G01R 15/16 324/126 |
| 5,847,616 | A | * | 12/1998 | Ng | H03B 5/24 331/34 |

* cited by examiner

VOLTAGE SENSOR

CROSS-REFERENCE TO RELATED PATENT APPLICATIONS

This application is a U.S. National Stage Application under 35 U.S.C. § 371 of International Patent Application No. PCT/RU2021/050418 filed Dec. 6, 2021, which claims the benefit of priority of Russian Patent Application No. 2020140169 filed Dec. 7, 2020, both of which are incorporated by reference in their entireties. The International Application was published on Jun. 16, 2022, as International Publication No. WO/2022/124942 A1.

FIELD OF THE INVENTION

The present invention relates to voltage sensors. The invention relates particularly but not exclusively to voltage sensors for switchgear.

BACKGROUND TO THE INVENTION

Voltage sensors may comprise components whose operation is temperature dependent and so the performance of the voltage sensor can also be temperature dependent. For some applications the affects of temperature on the performance of the voltage sensor is not significant and can be ignored. However, for other applications, including reclosers, circuit breakers and other switchgear for electrical power systems, it is important that the operation of the voltage sensor is accurate across a range of operating temperatures.

Temperature compensation of a voltage sensor may be performed by measuring operational temperature during use and using a suitably programmed controller to adjust the sensor output based on the measured temperature and the temperature characteristics of the relevant sensor components. However, this is a relatively complicated and expensive solution not least because it requires the use of temperature sensors at each location where there is a temperature dependent component.

It would be desirable to mitigate the problems outlined above.

SUMMARY OF THE INVENTION

From a first aspect the invention provides a voltage sensor comprising: a voltage input; a voltage output; a voltage reference; a first circuit portion connected between said voltage input and said voltage output, said first circuit portion comprising at least one impedance component providing a first impedance that is temperature dependent; and a second circuit portion connected between said voltage output and said voltage reference, said second circuit portion comprising at least one impedance component providing a second impedance that is temperature dependent, wherein said first and second circuit portions are configured such that the temperature dependence of said second impedance matches the temperature dependence of said first impedance at least within an operating temperature range, and wherein said at least one impedance component of said second circuit portion and said at least one impedance of said first circuit portion are located in one or more location that is subject to, in use, substantially the same temperature.

Preferably, said at least one impedance component of said first circuit portion comprises a single capacitor, and said first impedance is a first capacitance provided by said capacitor, or wherein said at least one impedance component of said first circuit portion comprises a single resistor, and said first impedance is a first resistance provided by said resistor.

Optionally, said at least one impedance component of said first circuit portion comprises a capacitor, or other impedance component, that is shaped and dimension for mounting on an electrical conductor.

Optionally, said at least one impedance component of said first circuit portion is sleeve-like in shape.

Optionally, said at least one impedance component of said second circuit portion comprises a single capacitor, and said second impedance is a second capacitance provided by said capacitor, or wherein said at least one impedance component of said second circuit portion comprises a single resistor, and said second impedance is a second resistance provided by said resistor.

Optionally, said capacitor, or other impedance component, of said second circuit portion has a temperature dependent capacitance, or impedance, characteristic that matches a temperature dependent capacitance, or impedance, characteristic of said capacitor, or other impedance component, of said first circuit portion at least in said operating temperature range.

Optionally, said at least one impedance component of said second circuit portion comprises a network of capacitors, said network of capacitors being configured to provide said second capacitance, or wherein said at least one impedance component comprises a network of other impedance components configured to provide said second impedance.

Optionally, said network of capacitors comprises at least one, and typically a plurality of, capacitors each having a respective temperature dependent capacitance characteristic, the network being configured such that a resultant temperature dependent capacitance characteristic of the network matches a temperature dependent capacitance characteristic of said first capacitance at least in said operating temperature range, or wherein said network of other impedance components comprises at least one, and typically a plurality of, impedance components, the network being configured such that a resultant temperature dependent impedance characteristic of the network matches a temperature dependent impedance characteristic of said first impedance at least in said operating temperature range.

Optionally, said at least one impedance component of said first circuit portion comprises a network of capacitors, said network of capacitors being configured to provide said first capacitance, or wherein said at least one impedance component comprises a network of other impedance components configured to provide said first impedance.

Optionally, the respective network of other impedance components comprises a network of resistors, or a network of at least one resistor and at least one capacitor.

The respective network may comprise a parallel network of impedance components.

In some embodiments, the voltage sensor is configured to operate as a capacitive voltage divider. Alternatively, the voltage sensor may be configured to operate as a resistive voltage divider. Alternatively, the voltage sensor may be configured to operate as a resistive-capacitive (RC) voltage sensor.

Typically, at least one impedance component of said second circuit portion is provided on a substrate, for example a printed circuit board (PCB).

Preferably, the capacitor, or other impedance component, of said second circuit portion is located adjacent said at least one impedance component of said first circuit portion.

In some embodiments, at least part of said network of capacitors or other impedance components of the second circuit portion is located adjacent said at least one impedance component of said first circuit portion.

The temperature dependence of said second impedance may be identical or substantially identical to the temperature dependence of said first impedance in said operating temperature range.

Preferably, a temperature dependent variation of the second circuit portion impedance differs from a corresponding temperature dependent variation of the first circuit portion by an amount that is less than said corresponding temperature dependent variation of the first circuit portion.

The temperature dependence of said first impedance may be variation in the value of said first impedance with respect to a nominal first impedance value in response to variation in temperature, and the temperature dependence of said second impedance is variation in the value of said second impedance with respect to a nominal second impedance value in response to variation in temperature.

In preferred embodiments, the variation in value of said first impedance with respect to said nominal first impedance and the variation in the value of said second impedance with respect to said nominal second impedance value are zero at a nominal temperature in said operating temperature range, said nominal temperature preferably corresponding to normal climatic conditions.

In preferred embodiments, said at least one impedance component of said second circuit portion is co-located with said at least one impedance of said first circuit portion.

From a second aspect the invention provides an electrical switch device comprising at least one voltage sensor according to the first aspect of the invention.

Typically, said at least one impedance component of said first circuit portion of said at least one voltage sensor is connected to a voltage terminal of said electrical switch device. Preferably, said at least one impedance component of said second circuit portion is located adjacent said at least one impedance component of said first circuit portion.

Said at least one impedance component of said second circuit portion may be mounted on said voltage terminal, or on said at least one impedance component of said first circuit portion, or on a part of said switch device that is located adjacent said voltage terminal, or on a support structure that also supports said at least one impedance component of said first circuit portion.

Optionally, said at least one impedance component of said first circuit portion is located around said voltage terminal.

Optionally, a current sensor is coupled to said voltage sensor, said at least one impedance component of said first circuit portion being adjacent said current sensor and said at least one impedance component of said second circuit portion is mounted on said current sensor.

From a third aspect the invention provides a method of measuring voltage using a voltage sensor comprising: a voltage input; a voltage output; a voltage reference; a first circuit portion connected between said voltage input and said voltage output, said first circuit portion comprising at least one impedance component providing a first impedance that is temperature dependent; and a second circuit portion connected between said voltage output and said voltage reference, said second circuit portion comprising at least one impedance component providing a second impedance that is temperature dependent, the method comprising configuring said first and second circuit portions such that the temperature dependence of said second impedance matches the temperature dependence of said first impedance at least within an operating temperature range; and locating said at least one impedance component of said second circuit portion and said at least one impedance of said first circuit portion such that they are subject to, in use, substantially the same temperature.

In preferred embodiments, a voltage sensor is implemented in the form of a capacitive divider and the capacitor(s) of a second arm of the voltage divider is physically located beside the capacitor(s) of a first arm. In addition, the capacitor(s) are chosen such that the temperature dependent characteristics of each arm of the voltage divider are identical or substantially identical, at least within a relevant operating temperature range.

More generally, in preferred embodiments, the capacitor(s) (or other impedance(s) as applicable) of the second arm is chosen such that its temperature dependence in the relevant operating temperature range differs from the corresponding temperature dependence of the capacitor(s) (or other impedance(s) as applicable) of the first arm by an amount that is less than said corresponding temperature dependence of the capacitor(s) (or other impedance(s) as applicable) of the first arm in the operating temperature range. For example, if the temperature dependence of the capacitor(s) (or other impedance(s) as applicable) of the first arm in the operating temperature range is 10%, then the temperature dependence of the capacitor(s) (or other impedance(s) as applicable) of the second arm differs from the temperature dependence of the capacitor(s) (or other impedance(s) as applicable) of the first arm by less than 10% in the relevant operating temperature range. This arrangement results in a reduction in temperature based errors in the operation of the voltage sensor. For example if the difference is 5%, there is a two-fold decrease in error in comparison with conventional sensors.

Optionally, the second arm may comprise a plurality of capacitors (and/or other impedances) connected in parallel with each other (or otherwise interconnected to form a network) with respective temperature characteristics (which may be different to each other) selected such that the resultant, or composite, temperature characteristic of the network of capacitors (and/or other impedances), and therefore of the second arm, matches or substantially matches the temperature characteristic of the first arm capacitor (and/or other impedance(s)) in the operating temperature range. Any part, e.g. any capacitor, of the second arm composite capacitor/impedance that has no, or a relatively low, dependence on temperature does not have to be located next to the first arm capacitor. Optionally, the first arm may comprise a plurality of capacitors (and/or other impedances) interconnected to form a network rather than a single capacitor.

Voltage sensors embodying the invention exhibit improved accuracy in comparison with voltage sensors without temperature compensation, and may also exhibit improved accuracy over temperature-compensated voltage sensors that rely on temperature measurement since temperature measurement can be a source of error. Moreover, embodiments of the invention do not require an active temperature compensation system, which reduces complexity and cost and increases reliability and service life.

Advantageously, one or more voltage sensors embodying the invention may be installed on a recloser, circuit breaker, vacuum circuit breaker or other switchgear in order to measure the voltage at a respective terminal of the relevant device. Since the measured terminal voltage may be used to control the operation of the device, the performance of the device is improved by the increased accuracy of the voltage sensor(s) provided at the respective terminal(s). The, or each, voltage sensor may be located within the casing of the relevant device (e.g. in the case of a recloser) or outside of the casing as is convenient.

Advantageously, voltage sensors embodying the invention operate accurately over a wider range of temperatures and a wider current range than voltage sensors without temperature compensation and are therefore suited for use in a wider range of applications.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
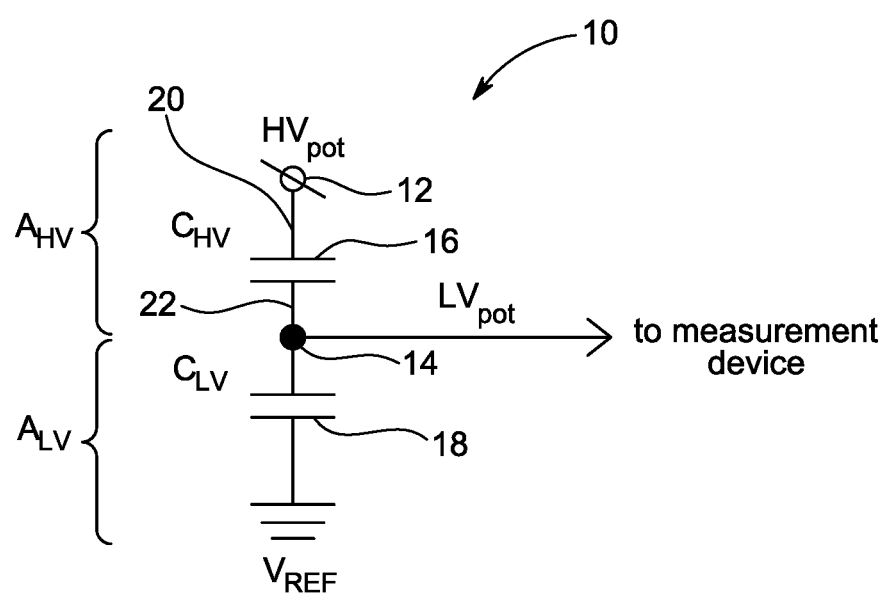
FIG. 1 is a schematic circuit diagram of a voltage sensor embodying a first aspect of the invention.

Referring now to FIG. 1 of the drawings there is shown a circuit diagram of voltage sensor 10 embodying one aspect of the invention. The voltage sensor 10 comprises a voltage divider, in particular a capacitive voltage divider. The voltage sensor 10 has a first circuit portion, or arm, $A_{HV}$ between a voltage input 12 and a voltage output 14, and a second circuit portion, or arm, $A_{LV}$ between the voltage output 14 and a voltage reference $V_{REF}$, which is conveniently electrical ground but may be any other suitable reference voltage. The voltage input 12, voltage output 14 and voltage reference $V_{REF}$ may be implemented in any conventional manner, e.g. by a respective terminal or other circuit connection or point.

The first and second circuit portions $A_{HV}$, $A_{LV}$ comprise a respective impedance such that the voltage $LV_{pot}$ at output 14 depends on the voltage $HV_{pot}$ at the voltage input 12 and the relative impedances of the first and second circuit portions. In preferred embodiments, the impedance of the first circuit portion $A_{HV}$ is a capacitance $C_{HV}$, preferably being provided by a first capacitor 16, typically being single capacitor. The preferred impedance of the second circuit portion $A_{LV}$ is a capacitance $C_{LV}$, which may be provided by a (single) second capacitor 18, or may be provided by a network of capacitors as described in more detail hereinafter. Hence, the output voltage $LV_{pot}$ depends on the input voltage $HV_{pot}$ and the relative capacitances $C_{HV}$, $C_{LV}$. In alternative embodiments, the voltage sensor 10 need not comprise a capacitive voltage divider and may instead comprise, for example, a resistive voltage divider in which each circuit portion $A_{HV}$, $A_{LV}$ comprises one or more resistor. Alternatively still, the voltage sensor 10 may be a resistive-capacitive (RC) voltage divider in which one of the circuit portions $A_{HV}$, $A_{LV}$ comprises one or more resistor and the other circuit portion comprises one or more capacitor, or in which each circuit portion $A_{HV}$, $A_{LV}$ comprises one or more respective RC circuit. More generally, each circuit portion $A_{HV}$, $A_{LV}$ of the voltage divider circuit may comprise a single impedance component or a network of impedance components. Accordingly, although the preferred embodiment is described herein in the context of a capacitive voltage divider, it will be understood that the invention is not limited to such, and that any description provided herein in respect of capacitors or capacitance also applies more generally in relation to other impedance components or impedance values as would be apparent to a skilled person.

In typical embodiments, the capacitance $C_{LV}$ of the second circuit portion $A_{LV}$ is higher than the capacitance $C_{HV}$ of the first circuit portion $A_{HV}$. In typical embodiments, the capacitance $C_{LV}$ of the second circuit portion $A_{LV}$ is in the order of single nanofarads to single millifarads, and the capacitance $C_{HV}$ of the first circuit portion $A_{HV}$ is in the order of single picofarads to single nanofarads.

In typical embodiments the input voltage $HV_{pot}$ is relatively high (e.g. being provided by a high voltage (HV) or medium voltage (MV) electrical system) and the values of the capacitances $C_{LV}$, $C_{HV}$ are selected to cause the output voltage $LV_{pot}$ to be at a level that is compatible with being received by a controller (not shown), e.g. a microcontroller or PLC. By way of example, depending on the application typical voltage levels at input 12 may be in the order of 10 kV, 24 kV or 36 kV, while at output 14 the typical voltage level may be in the order of millivolts up to hundreds of volts.

In alternative embodiments (not illustrated) the voltage sensor 10 may comprise alternative forms of voltage divider, in particular with alternative circuit topologies to that illustrated in FIG. 1. For example, either one or both of the capacitances $C_{HV}$, $C_{LV}$ may be implemented as one or more capacitor, e.g. as a single capacitor or a network of more than one capacitor. For example, either one or both of capacitors 16, 18 may be implemented as two or more capacitors in series, and/or as two or more capacitors in parallel, or other network of capacitors. Optionally, the second circuit portion $A_{LV}$ may comprise a network one or more capacitors in parallel and/or in series for thermal compensation of the voltage divider (which may be represented by capacitor 18 in FIG. 1). Optionally, one or more resistor (not shown) may be included in the voltage divider. For example, one or more resistor may be provided in the second circuit portion to compensate for phase shifts.

In use, the voltage input 12 of the voltage sensor 10 is electrically connected to a suitable part, typically an electrical conductor or electrical terminal, of an electrical circuit in order that the voltage sensor 10 may measure the voltage at the corresponding point in the electrical circuit. Typically, the voltage input 12 corresponds to a first terminal 20 of the capacitor 16, the other terminal 22 of the capacitor 16 being connected to the voltage output 14.

In preferred embodiments, the voltage sensor 10 is particularly suited for use with an electrical switch device, for example a circuit breaker, vacuum circuit breaker, recloser or other switchgear, especially switch devices for AC electrical systems, in particular AC electrical power systems. In such applications, the voltage input 12 is electrically connected to a voltage terminal of the electrical switch such that the voltage terminal provides the input voltage $HV_{pot}$. The voltage input 12 may be connected directly to the terminal or to a conductor connected to the terminal as is convenient.

Figures 2A, 2B:
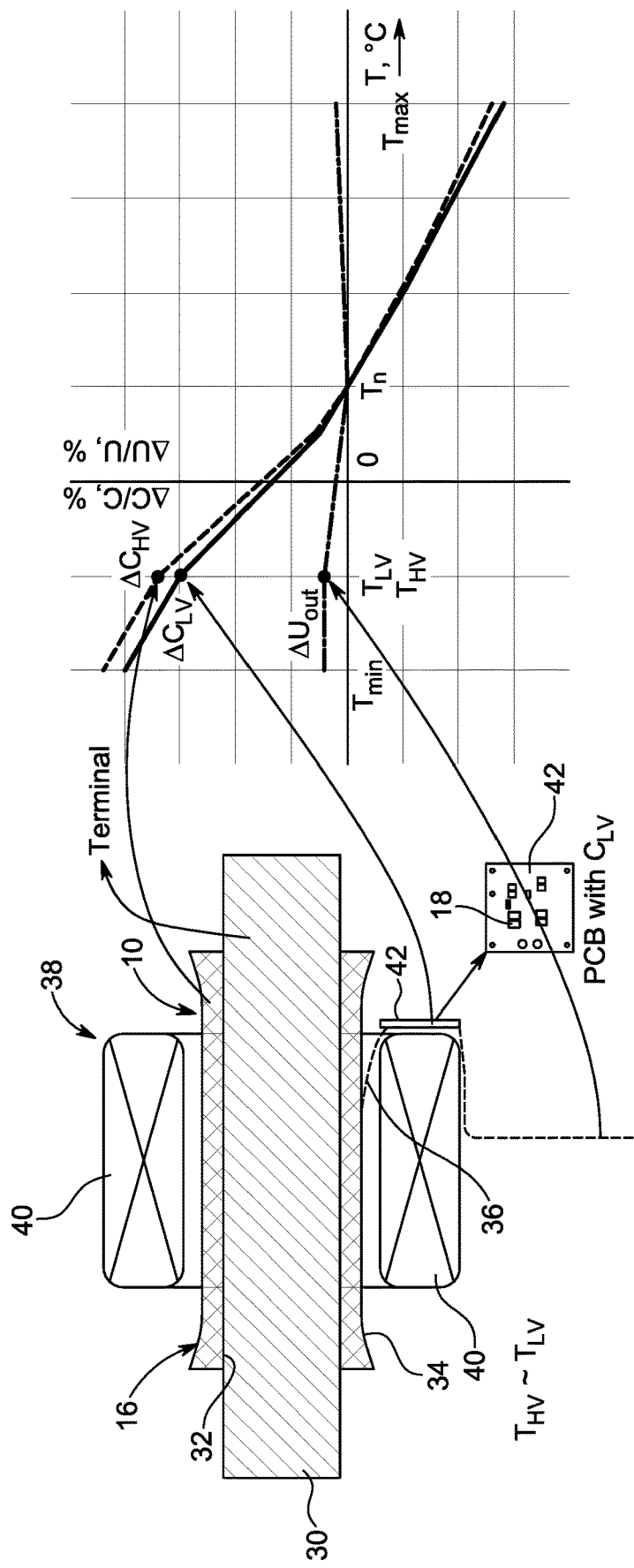
FIG. 2A shows a voltage sensor embodying the invention, the voltage sensor having co-located capacitors.
FIG. 2B is a graph illustrating the performance of the capacitors of the voltage sensor of FIG. 2A over a range of temperatures.

FIG. 2A shows by way of example the voltage sensor 10 connected to an electrical conductor 30 which may be part of an electrical switch device, e.g. a voltage terminal or a conductor connected to a voltage terminal. In this example, the first capacitor 16 is sleeve-like or annular in shape and is located around the conductor 30. The inner surface 32 of the sleeve structure serves as the first terminal 20 of the capacitor 16 and therefore as the voltage input 12 of the voltage sensor 10. As such, the inner surface 32 is electrically connected to the conductor 30. The outer surface 34 of the sleeve structure serves as the other terminal 22 of the capacitor 16 and is connected to the voltage output 14 by electrical connector 36, which may comprise a wire, cable or other suitable electrical conductor(s). The sleeve-like form of the capacitor 16 is preferred as it facilitates using the conductor 30 as a support for the capacitor. It will be understood however that the capacitor 16 may alternatively take other conventional forms. More generally, in typical embodiments, the capacitor(s) or other impedance(s) of the first circuit portion $A_{HV}$ are high voltage (HV) components that are usually connected to a high voltage terminal and which are typically not suitable for mounting on a PCB or similar substrate (usually because of their size).

A current sensor 38 may be provided for sensing electrical current flowing in the conductor 30. The current sensor 38 comprises one or more electric coil 40 provided around the conductor 30, the coil(s) typically comprising an electrically insulated conductor. The current sensor 38 may be of any conventional type, for example comprising a Rogowski coil or a current transformer. Optionally, the capacitor 16 is located between the coil(s) 40 and the conductor 30. In alternative embodiments, the current sensor 38 may be omitted.

Referring now to FIG. 2B, the capacitor 16 of the first circuit portion $A_{HV}$ has a temperature dependent characteristic whereby its capacitance varies with temperature, in particular ambient temperature. FIG. 2B illustrates the temperature characteristic $\Delta C_{HV}$ of capacitor 16 (or capacitance $C_{HV}$), in particular the relative change in capacitance ($\Delta C_{HV}$) in an operating temperature range from $T_{min}$ to $T_{max}$. By way of example, a typical value for $T_{min}$ is $-60°$ C. and a typical value for $T_{max}$ is $+100°$ C. The value of $\Delta C_{HV}$ at any given temperature corresponds to a change, conveniently expressed as a percentage, in capacitance with respect to a nominal or rated value.

Similarly, the capacitor 18 (or capacitors in the case where capacitance $C_{LV}$ is provided by more than one capacitor) of the second circuit portion $A_{LV}$ has a temperature dependent characteristic $\Delta C_{LV}$ whereby its capacitance varies with temperature, in particular ambient temperature.

Temperature-dependent variation of capacitance values could adversely affect the accuracy of the voltage sensor 10, particularly in cases where different capacitors may be subjected to different temperatures or temperature change profiles during use. To mitigate this problem, the voltage sensor 10 is configured such that capacitor(s) of the second circuit portion $A_{LV}$ cause the temperature-dependent variation of the capacitance $C_{LV}$ to match the temperature-dependent variation of the capacitance $C_{HV}$ of the first circuit portion $A_{HV}$, at least within an operating temperature range of the sensor 10. The respective temperature-dependent variations may be said to match if they are identical or substantially identical. The preferred arrangement is such that the temperature-dependent variation value of the second circuit portion capacitance $C_{LV}$ differs from the corresponding temperature-dependent variation value of the first circuit portion capacitance $C_{HV}$ by an amount that is less than the corresponding temperature-dependent variation value of the capacitance $C_{HV}$ in the operating temperature range. In preferred embodiments, the amount of the difference in the respective temperature-dependent variation is 5% or lower, preferably 0.5% or lower, e.g. up to 0.05%. It will be understood that the same principles apply in embodiments where the impedances of the first and second circuit portions are not capacitive, or are partly capacitive, e.g. in cases where the voltage sensor 10 comprises a resistive voltage divider or an RC voltage divider.

In embodiments where the first circuit portion $A_{HV}$ comprises capacitor 16 and the second circuit portion $A_{LV}$ comprises capacitor 18, causing the respective temperature-dependent variations to match may be achieved by using capacitors that have matching temperature-dependent capacitance profiles, i.e. the temperature-dependent capacitance profile of capacitor 18 matches the temperature-dependent capacitance profile of capacitor 16. Alternatively, in embodiments where the second circuit portion $A_{LV}$ comprises a network of capacitors, the capacitors of the network and/or the configuration of the network may be selected such that the temperature-dependent variation of the resultant capacitance $C_{LV}$ matches the temperature-dependent variation of the capacitance $C_{HV}$. Preferably, in such embodiments the capacitors of the second circuit portion $A_{LV}$ are connected in parallel with each other.

FIG. 2B illustrates the temperature characteristic $\Delta C_{LV}$ of capacitor 18 (or capacitance $C_{LV}$), in particular the change in capacitance ($\Delta C_{LV}$) in an operating temperature range from $T_{min}$ to $T_{max}$. By way of example, a typical value for $T_{min}$ is $-60°$ C. and a typical value for $T_{max}$ is $+100°$ C. The value of $\Delta C_{LV}$ at any given temperature corresponds to a relative change, conveniently expressed as a percentage, in capacitance with respect to a nominal or rated capacitance value. It can be seen that the temperature-dependent capacitance profile $\Delta C_{LV}$ of the second circuit portion $A_{LV}$ matches the temperature dependent capacitance profile $\Delta C_{HV}$ of the first circuit portion $A_{HV}$ in the operating temperature range, although in this example they are not identical across the entire operating range. Preferably, the profiles $\Delta C_{LV}$, $\Delta C_{HV}$ are identical (and preferably equal to zero) at a nominal temperature Tn. The profiles $\Delta C_{LV}$, $\Delta C_{HV}$ are preferably also identical in a sub-range of temperatures between $T_{min}$ and $T_{max}$, centered around Tn. Typically, the profiles $\Delta C_{LV}$, $\Delta C_{HV}$ are substantially the same but not identical towards each end of the range $T_{min}$ to $T_{max}$. More generally, values of $\Delta C_{LV}$ and $\Delta C_{HV}$ are identical at least at the nominal temperature Tn, and identical or substantially the same across the rest of the operating temperature range. The matching profiles $\Delta C_{LV}$, $\Delta C_{HV}$ mean that the relative change with temperature of each of the capacitance values $\Delta C_{LV}$, $\Delta C_{HV}$ is the same or substantially the same.

Typically, the calibration of the relevant capacitor(s) is such that each of $\Delta C_{LV}$ and $\Delta C_{HV}$ is zero at the nominal temperature Tn, which is preferably a temperature that corresponds to normal climatic conditions (NCC), e.g. $+25°$ C., for the voltage sensor 10. The relevant capacitance(s) may be measured at the nominal temperature Tn during testing or set up, and the measurement may be taken to represent $\Delta C=0$ for the purpose of calibration. The sensor 10 may be calibrated based on this measurement. As a result, the profiles $\Delta C_{LV}$, $\Delta C_{HV}$ intersect at Tn. At other temperatures within the operating range the matching profiles $\Delta C_{LV}$, $\Delta C_{HV}$ mean that the relative change in each of the capacitance values $\Delta C_{LV}$, $\Delta C_{HV}$ is the same or substantially the same, which maintains the accuracy of the sensor 10.

In many applications, including switchgear applications, different parts of a given device, e.g. a switch device, may experience different temperatures and/or different changes in temperature over time, e.g. because of current levels and/or variations in ambient temperatures. For example, in the case of switchgear, especially for MV and HV applications, the temperature at the input and output terminals can be much higher than at other parts of the device because of the current level at any given time. Therefore, the mitigation of problems that can arise from the temperature-dependent variation of capacitance values also involves locating the relevant capacitor(s) of the first and second circuit branches $A_{HV}$, $A_{LV}$ such that they are subjected to the same or substantially the same temperature during use. Advantageously, this is achieved by co-locating the relevant capacitors. In preferred embodiments, at least one capacitor of the second circuit portion $A_{LV}$ is co-located with the capacitor 16 of the first circuit portion $A_{HV}$. In embodiments where the second circuit portion $A_{LV}$ comprises capacitor 18, capacitor 18 is located adjacent capacitor 16 of the first circuit portion $A_{HV}$. Alternatively, in embodiments where the second circuit portion $A_{LV}$ comprises a network of capacitors, at least the temperature-dependent capacitor(s) of the network are located adjacent the capacitor 16. In this connection it is noted that in some embodiments, one or more capacitor of the capacitor network in the second circuit portion $A_{LV}$ may have a capacitance that is not temperature dependent and therefore does not need to be located beside the temperature dependent capacitors, although it is typically convenient to do so. By locating all of the capacitors in the first and second circuit portions $A_{HV}$, $A_{LV}$ that have a temperature dependent capacitance adjacent each other, i.e. in substantially the same location, they are subjected to the same or substantially the same temperature during use. The co-location of capacitors, together with the matching temperature dependent capacitance profiles $\Delta C_{LV}$, $\Delta C_{HV}$, maintains the desired relationship between the capacitance values $C_{HV}$, $C_{LV}$, which in turn maintains the accuracy of the voltage sensor 10. More generally, all of the capacitors in the first and second circuit portions $A_{HV}$, $A_{LV}$ that have a temperature dependent capacitance are located in one or more location that is subject to the same or substantially the same temperature (including any changes in temperature), in particular ambient temperature (which may include the effects of heating caused by current flow), during use. This is conveniently achieved by locating the relevant capacitors adjacent each other as described above, but the desired co-location may involve locating the relevant capacitors close enough to each other that they experience the same or substantially the same temperature during use without necessarily being beside each other. Typically, the temperatures may be said to be substantially the same if there is a difference of 2° C. or less, preferably 1° C. or less. In typical embodiments, the relevant capacitors are 0.2 m apart or less, preferably 0.05 m apart or less.

This result is illustrated in FIG. 2B which shows the error in the output voltage $\Delta U_{OUT}$ at sensor output 14 in the operating temperature range $T_{min}$ to $T_{max}$. The value of $\Delta U_{OUT}$ at any given temperature corresponds to a percentage error in voltage with respect to a nominal value. It can be seen from FIG. 2B that when the temperature $T_{HV}$ of the capacitor 16 of the first circuit portion $A_{HV}$ is the same as the temperature $T_{LV}$ of the capacitor(s) of the second circuit portion $A_{LV}$, the value of $\Delta U_{OUT}$ is relatively small, indicating that the sensor 10 is operating accurately. It may also be seen that the value of the error $\Delta U_{OUT}$ varies by a relatively small amount with temperature provided the relevant capacitors are selected such that the capacitances $C_{HV}$, $C_{LV}$ have the same or a similar dependence on temperature. In the ideal case where the temperature-dependence of the capacitances is identical, i.e. $\Delta C_{HV}/C_{HV} = \Delta C_{LV}/C_{LV}$, then $\Delta U_{OUT} = 0$.

By way of contrast, it may be seen from FIG. 2B that if $T_{LV}$ and $T_{HV}$ are different, then the respective values of $\Delta C_{LV}$ and $\Delta C_{HV}$ may be significantly different, resulting in a relatively large $\Delta U_{OUT}$, which adversely affects the accuracy of the voltage sensor 10. Such discrepancies in the values of $T_{LV}$ and $T_{HV}$ are common in conventional voltage sensor arrangements in which components are significantly spaced apart. For example, in a conventional voltage sensor for a circuit breaker or recloser, one capacitor may be located at a voltage terminal while other capacitor(s) may be provided in a remotely located controller. When current flows through the terminal, the temperature on the capacitor 16 increases while the temperature at the controller does not such that $T_{HV} > T_{LV}$ and the error $\Delta U_{OUT}$ is relatively high. Similarly, if the temperature-dependence of the capacitances $C_{HV}$, $C_{LV}$ are significantly different, then this will result in a relatively large value for $\Delta U_{OUT}$.

The relevant capacitor(s) of the second circuit portion $A_{LV}$ may be provided on any suitable support structure that allows them to be located beside the capacitor 16, and such support structures may vary from application to application. Optionally, the relevant capacitor(s) of the second circuit portion $A_{LV}$ may be supported by the capacitor 16 itself, or the conductor 30, via any suitable electrically insulating mounting component(s), e.g. an insulating sleeve and/or substrate. More generally, the capacitors of the first and second circuit portions may be provided adjacent each other on any suitable common support structure, e.g. comprising a substrate and/or housing, which may be part of the voltage sensor, or on any convenient part of the device to which the voltage sensor 10 is connected or integrated. Capacitors that are part of a capacitor network are electrically connected in any convenient conventional manner to form the network. In the illustrated embodiment, the capacitor(s) of the second circuit portion $A_{LV}$ are mounted on the coil 40 of the current sensor 38. It is convenient to place the capacitor(s) of the second circuit portion $A_{LV}$ next to the current sensor 38, which has a good thermal conductivity, since it is usually made of copper and steel and the temperature next to it is substantially the same as the temperature at the capacitor 16. More generally, the capacitor(s) implementing $C_{LV}$ are placed in any location such that there is the same or substantially the same temperature for both the first and second portions of the voltage divider circuit.

Conveniently, the capacitor(s) of the second circuit portion $A_{LV}$ (or at least the temperature dependent ones) are provided on a support comprising an electrically insulating substrate 42, for example a printed circuit board (PCB). This facilitates mounting the capacitor(s) adjacent the capacitor 16, as well as facilitating co-location of the capacitors of the second circuit portion in embodiments where there is a network of capacitors making up $C_{LV}$. Any suitable conventional capacitor(s) may be used to implement $C_{LV}$, typically any type that is suitable for mounting on a PCB or the like.

Figure 3:
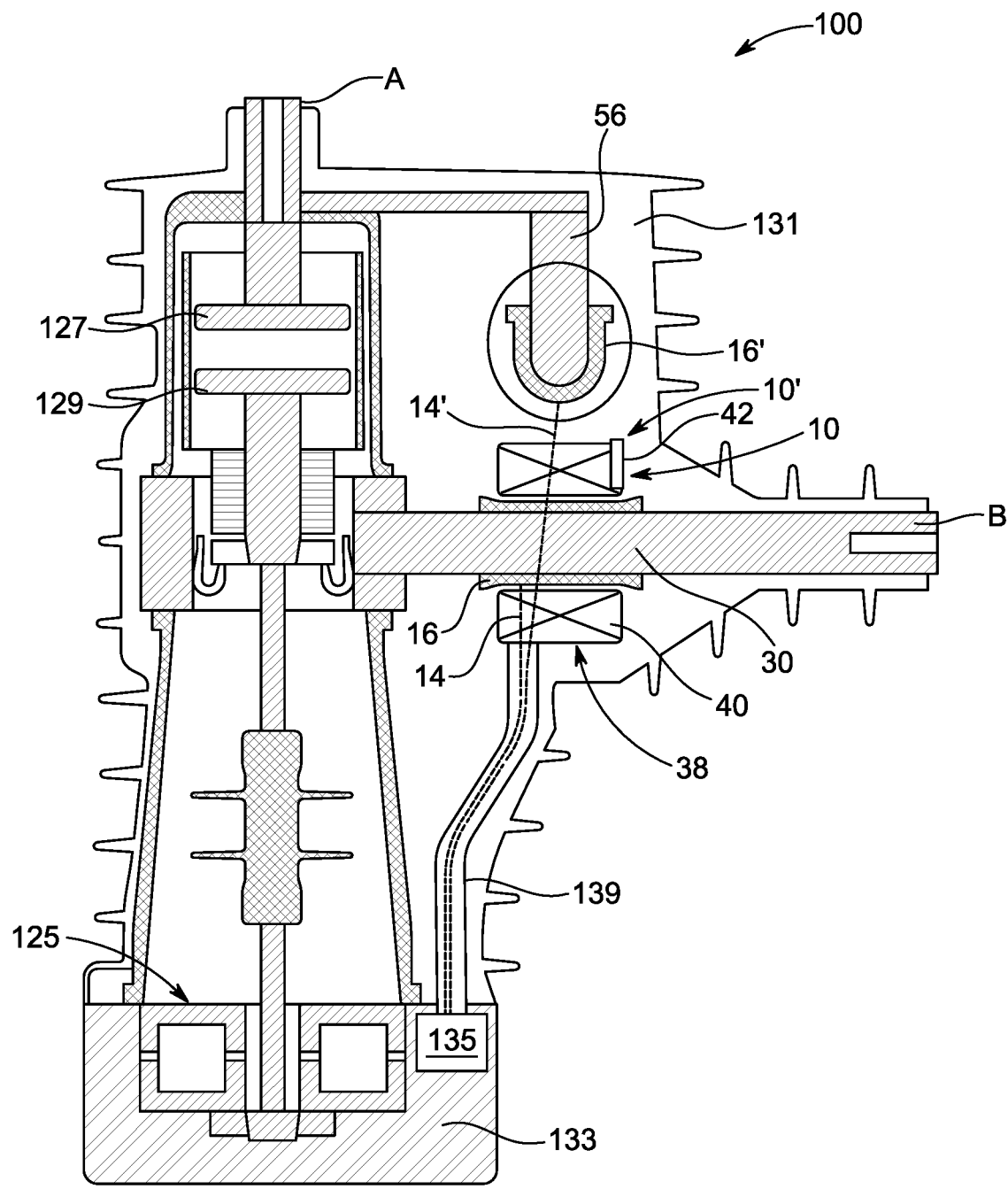
FIG. 3 shows an electrical switch device embodying a second aspect of the invention, the switch device including at least one voltage sensor embodying the first aspect of the invention.

Advantageously, one or more instances of the voltage sensor 10 may be used in an electrical switch device, in particular an automatically operating switch device. FIG. 3 shows, generally indicated as 100, an example of automatically operating electrical switch device. The illustrated switch device 100 is of a type commonly referred to as a circuit breaker. The switch device 100 is configured to operate automatically in a fault condition, e.g. a current overload or short circuit, to protect the circuit (not shown) into which it is incorporated during use. It achieves this by breaking the electrical circuit in response to detecting a fault, thereby interrupting current flow. As is described in more detail hereinafter, the switch device 100 includes at least one voltage sensor embodying the invention for monitoring the voltage at a respective one, or both, of its terminals. The, or each, voltage sensor may be used to control operation of the switch device 100. In some embodiments, the switch device 100 can be operated manually (e.g. mechanically or electro-mechanically by manual activation of a user control (not shown)) or automatically (typically electro-mechanically in response to the switch device 100 detecting that the fault has gone, and/or after a threshold period of time has expired since activation). Switch devices that operate automatically are commonly known as reclosers. In the embodiment of FIG. 3 the switch device 100 is a vacuum circuit breaker. It will be understood however that the invention is not limited to vacuum circuit breakers and may alternatively be used with other types of circuit breakers, reclosers or other switchgear or electrical switch devices, and the same or similar description applies as would be apparent to a skilled person. The switch device 100 is particularly intended for use with AC electrical systems, especially AC electrical power systems. The switch device 100 may be configured for use with low voltage (LV), medium voltage (MV), or high voltage (HV) depending on the application. Typically, a respective instance of the switch device 100 is provided for each phase, or each pole, of the AC electrical power provided by the AC electrical power system.

The switch device 100 comprises first and second electrical terminals A, B by which the switch device 100 may be connected to an external circuit (not shown). In use, either one of the terminals A, B is connected to a supply, or line, voltage, and the other terminal B, A is connected to an electrical load.

In this example, the voltage sensor 10 is connected to terminal B in order to measure the voltage at terminal B. Alternatively or in addition, a voltage sensor 10', also embodying the invention, may be provided for sensing or measuring the voltage at the first terminal A. The voltage sensor 10' may be the same or similar to the voltage sensor 10 and the same or similar description applies as would be apparent to a skilled person. In this example, the capacitor 16' of the first circuit portion of sensor 10' is provided on and electrically connected to a conductive support 56 that is electrically connected to the first terminal A. The capacitor(s) of the second circuit portion of sensor 10' may be provided on substrate 42, or on a separate substrate at the same located or near by. The capacitor 16' and the temperature dependent capacitor(s) of the second circuit portion of sensor 10' are sufficiently close to each other that they experience the same or substantially the same temperature during use.

The outputs 14,14' of the sensors 10, 10' are provided to a controller 135 which is configured to measure or otherwise detect or evaluate the voltage outputs 14,14'. The controller 135 may include means for determining if the voltage level at the outputs 14,14' exceeds a threshold value, and/or if one or more other characteristic of the voltage signal meets one or more other criteria, which may vary depending on the embodiment. The controller 135 may be responsive to the signals from the sensors 10, 10', i.e. from the outputs 14, 14', and/or from the current sensor 38 to control the operation of the switch device 100. In particular, the controller 135 may be configured to operate actuator 125 to cause contacts 127, 129 to open. In some embodiments, the controller 135 may be configured to cause the actuator 125 to close the contacts 127, 129 depending on one or more other criterion, e.g. determining that the voltage level at the output 14' is at or below a threshold, or after a period of time has expired (e.g. in embodiments where the device 10 is a recloser). Alternatively, or in addition (e.g. in a different mode of operation), the controller 135 may use either or both of the voltage outputs 14, 14' to measure the electrical power and/or energy flowing through the switch device 100.

The controller 135 may take any convenient form, for example comprising one or more suitably configured electric circuit and/or a suitably programmed microprocessor, microcontroller or other processor. Optionally, at least part, and optionally all, of the controller 135 may be included in the switch device 100, for example in casing 131 or in a base unit 133. In typical embodiments, however, the controller 135 is provided separately from the switch device 100 and may communicate with the switch device 100 by any conventional optical, wired or wireless means in order to perform any or all of the operations described herein. In the illustrated example, a conduit 139 carries wires from the current sensor 38 to the controller 135 and from the voltage sensors 10, 10' to the controller 135.

Optionally, at least part of the switch device 100 is provided in casing 131. At least part of, and preferably all of, the casing 131 is formed from an electrically insulating material, for example ceramic, rubber, plastics or resins (e.g. epoxide resin or polyester resin). The casing 131 may comprise a moulding or other solid structure in which some or all of the components of the switch device 100 are embedded, i.e. such that some or all of the components of the circuit breaker are moulded into or embedded within the insulating material. In preferred embodiments, the voltage sensors 10, 10' (or at least the temperature dependent capacitors thereof) are provided within the casing. Alternatively or in addition, all or part of the casing 131 may be hollow, defining one or more cavity for receiving at least some of the components of the switch device 100. In cases where the casing 131 is hollow, it may be coated with a dielectric or electrically insulating material. Alternatively, the switch device 100 may be provided in a metallic or conductive casing (e.g. of a type sometimes referred to as a tank structure) in which the components are not embedded in insulating material, insulation being provided as required by other insulating means, e.g. air and/or dielectric structure(s).

Voltage sensors embodying the invention may be used not only for voltage measurement in the context of switch operation, relay protection and emergency control systems, but also for measuring the power and/or energy flowing through the switch 100 or any other electrical device into which the voltage sensor(s) is incorporated or to which it is connected, e.g. to ensure the functioning of an electric energy meter, which typically has high requirements for voltage measurement accuracy.

In some embodiments, as is for example illustrated in FIG. 3, voltage sensors embodying the invention may be integrally formed with the device (e.g. the switch 100) in respect of which voltage is to be measured or monitored. In other embodiments (not illustrated), voltage sensors embodying the invention may be provided as a separate or stand-alone device that can be connected to another device (e.g. switch 100 or power meter or busbar) in respect of which voltage is to be measured or monitored.

The invention is not limited to the embodiment(s) described herein but can be amended or modified without departing from the scope of the present invention.

The invention claimed is:

1. A voltage sensor comprising:
a voltage input;
a voltage output;
a voltage reference;
a first circuit portion connected between said voltage input and said voltage output, said first circuit portion comprising at least one impedance component providing a first impedance that is temperature dependent; and a second circuit portion connected between said voltage output and said voltage reference, said second circuit portion comprising at least one impedance component providing a second impedance that is temperature dependent, wherein said first and second circuit portions are configured such that the temperature dependence of said second impedance matches the temperature dependence of said first impedance at least within an operating temperature range, and wherein said at least one impedance component of said second circuit portion and said at least one impedance component of said first circuit portion are located in one or more location that is subject to, in use, substantially the same temperature, and wherein said at least one impedance component of said first circuit portion comprises a first impedance component that is shaped and dimensioned for mounting on an electrical conductor, said first impedance component having an inner surface for contacting said electrical conductor when said first impedance component is mounted on said electrical conductor, and an outer surface connected to said second circuit portion.

2. The voltage sensor of claim 1, wherein said at least one impedance component of said first circuit portion comprises a single capacitor, and said first impedance is a first capacitance provided by said capacitor, or wherein said at least one impedance component of said first circuit portion comprises a single resistor, and said first impedance is a first resistance provided by said resistor.

3. The voltage sensor of claim 1, wherein said at least one impedance component of said first circuit portion comprises a capacitor.

4. The voltage sensor of claim 1, wherein said at least one impedance component of said first circuit portion is sleeve-like in shape.

5. The voltage sensor of claim 1, wherein said at least one impedance component of said second circuit portion comprises a single capacitor, and said second impedance is a second capacitance provided by said capacitor, or wherein said at least one impedance component of said second circuit portion comprises a single resistor, and said second impedance is a second resistance provided by said resistor, and wherein the capacitor, or other impedance component, of said second circuit portion is located adjacent said at least one impedance component of said first circuit portion.

6. The voltage sensor of claim 5, wherein said at least one impedance component of said first circuit portion comprises a single capacitor, and said first impedance is a first capacitance provided by said capacitor, or wherein said at least one impedance component of said first circuit portion comprises a single resistor, and said first impedance is a first resistance provided by said resistor, wherein said capacitor, or other impedance component, of said second circuit portion has a temperature dependent capacitance, or impedance, characteristic that matches a temperature dependent capacitance, or impedance, characteristic of said capacitor, or other impedance component, of said first circuit portion at least in said operating temperature range.

7. The voltage sensor of claim 1, wherein said at least one impedance component of said second circuit portion comprises a network of capacitors, said network of capacitors being configured to provide said second capacitance, or wherein said at least one impedance component comprises a network of other impedance components configured to provide said second impedance, and wherein said network of capacitors comprises at least one, and typically a plurality of, capacitors each having a respective temperature dependent capacitance characteristic, the network being configured such that a resultant temperature dependent capacitance characteristic of the network matches a temperature dependent capacitance characteristic of said first capacitance at least in said operating temperature range, or wherein said network of other impedance components comprises at least one, and typically a plurality of, impedance components, the network being configured such that a resultant temperature dependent impedance characteristic of the network matches a temperature dependent impedance characteristic of said first impedance at least in said operating temperature range.

8. The voltage sensor of claim 1, wherein said at least one impedance component of said first circuit portion comprises a network of capacitors, said network of capacitors being configured to provide said first capacitance, or wherein said at least one impedance component comprises a network of other impedance components configured to provide said first impedance.

9. The voltage sensor of claim 7, wherein the respective network of other impedance components comprises a network of resistors, or a network of at least one resistor and at least one capacitor.

10. The voltage sensor of claim 1, being configured to operate as a capacitive voltage divider or to operate as a resistive voltage divider, or to operate as a resistive-capacitive (RC) voltage sensor.

11. The voltage sensor of claim 1, wherein at least one impedance component of said second circuit portion is provided on a substrate, for example with a printed circuit board (PCB).

12. The voltage sensor of claim 7, wherein at least part of said network of capacitors or other impedance components of the second circuit portion is located adjacent said at least one impedance component of said first circuit portion.

13. The voltage sensor of claim 1, wherein the temperature dependence of said second impedance is identical or substantially identical to the temperature dependence of said first impedance in said operating temperature range.

14. The voltage sensor of claim 1, wherein a temperature dependent variation of the second circuit portion impedance differs from a corresponding temperature dependent variation of the first circuit portion by an amount that is less than said corresponding temperature dependent variation of the first circuit portion.

15. The voltage sensor of claim 1, wherein the temperature dependence of said first impedance is variation in the value of said first impedance with respect to a nominal first impedance value in response to variation in temperature, and the temperature dependence of said second impedance is variation in the value of said second impedance with respect to a nominal second impedance value in response to variation in temperature, and wherein the variation in value of said first impedance with respect to said nominal first impedance and the variation in the value of said second impedance with respect to said nominal second impedance value are zero at a nominal temperature in said operating temperature range, said nominal temperature corresponding to normal climatic conditions.

16. The voltage sensor of claim 1, wherein said at least one impedance component of said second circuit portion is co-located with said at least one impedance component of said first circuit portion.

17. An electrical switch device comprising at least one voltage sensor, said electrical switch device having a voltage terminal comprising an electrical conductor, said at least one voltage sensor comprising:
- a voltage input;
- a voltage output;
- a voltage reference;
- a first circuit portion connected between said voltage input and said voltage output, said first circuit portion comprising at least one impedance component providing a first impedance that is temperature dependent; and
- a second circuit portion connected between said voltage output and said voltage reference, said second circuit portion comprising at least one impedance component providing a second impedance that is temperature dependent,
- wherein said first and second circuit portions are configured such that the temperature dependence of said second impedance matches the temperature dependence of said first impedance at least within an operating temperature range,
- and wherein said at least one impedance component of said second circuit portion and said at least one impedance component of said first circuit portion are located in one or more location that is subject to, in use, substantially the same temperature, and
- wherein said at least one impedance component of said first circuit portion comprises a first impedance component having a body that is shaped and dimensioned for mounting on said electrical conductor of said voltage terminal, said first impedance component being mounted on said electrical conductor such that an inner surface of said body contacts said electrical conductor to provide said voltage input, and wherein an outer surface of said body is connected to said voltage output, and
- wherein said at least one impedance component of said second circuit portion is located adjacent said at least one impedance component of said first circuit portion, and
- wherein said at least one impedance component of said second circuit portion is mounted on said voltage terminal, or on said at least one impedance component of said first circuit portion, or on a part of said switch device that is located adjacent said voltage terminal, or on a support structure that also supports said at least one impedance component of said first circuit portion.

18. The switch device of claim 17, wherein said at least one impedance component of said first circuit portion is sleeve-like in shape and is located around said voltage terminal.

19. The switch device of claim 17, wherein a current sensor is coupled to said voltage sensor, said at least one impedance component of said first circuit portion being adjacent said current sensor and said at least one impedance component of said second circuit portion is mounted on said current sensor.

20. A voltage sensor comprising:
- a voltage input;
- a voltage output;
- a voltage reference;
- a first circuit portion connected between said voltage input and said voltage output, said first circuit portion comprising at least one impedance component providing a first impedance that is temperature dependent; and
- a second circuit portion connected between said voltage output and said voltage reference, said second circuit portion comprising at least one impedance component providing a second impedance that is temperature dependent,
- wherein said first and second circuit portions are configured such that the temperature dependence of said second impedance matches the temperature dependence of said first impedance at least within an operating temperature range, and
- wherein said at least one impedance component of said second circuit portion and said at least one impedance component of said first circuit portion are located in one or more location that is subject to, in use, substantially the same temperature, and
- wherein said at least one impedance component of said first circuit portion comprises a capacitor that is sleeve-like in shape and is mountable on an electrical conductor such that an inner surface of said capacitor contacts said electrical conductor, said inner surface serving as a first terminal of the capacitor and providing said voltage input, said capacitor having an outer surface serving as a second terminal of the capacitor and being electrically connected to said voltage output.

* * * * *